Dec. 16, 1952 W. E. RONEY 2,621,586
COMBINATION CHARCOAL BROILER AND GRIDDLE
Filed March 8, 1951 3 Sheets-Sheet 2
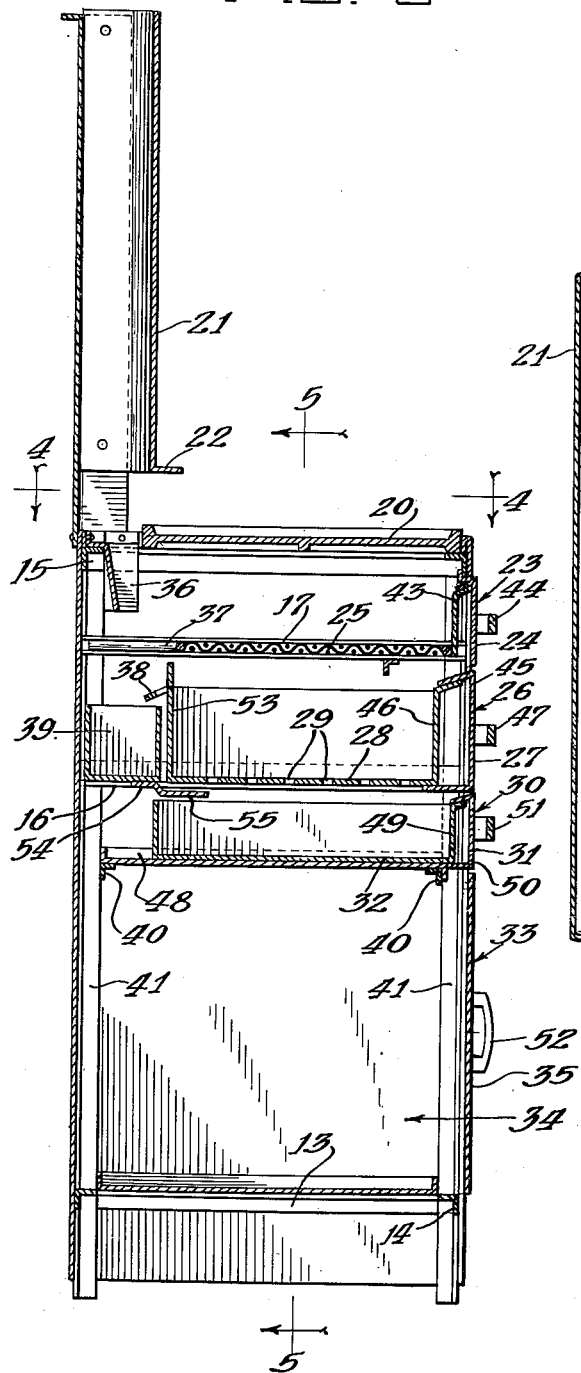
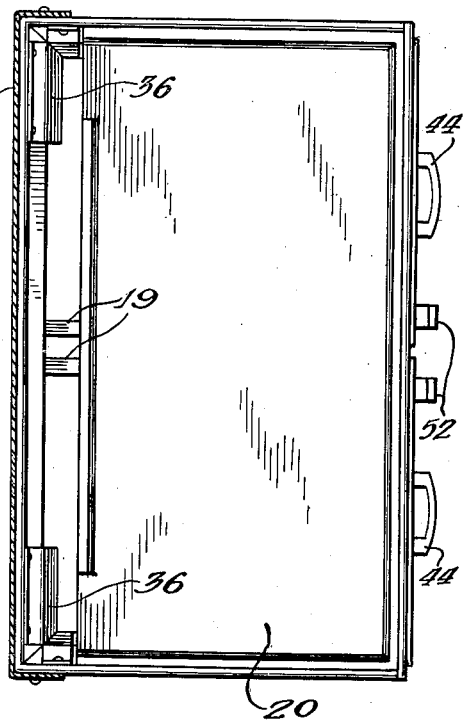
INVENTOR.
Walter E. Roney
BY
Wallace and Cannon
Attorneys Dec. 16, 1952   W. E. RONEY   2,621,586
COMBINATION CHARCOAL BROILER AND GRIDDLE
Filed March 8, 1951   3 Sheets-Sheet 3

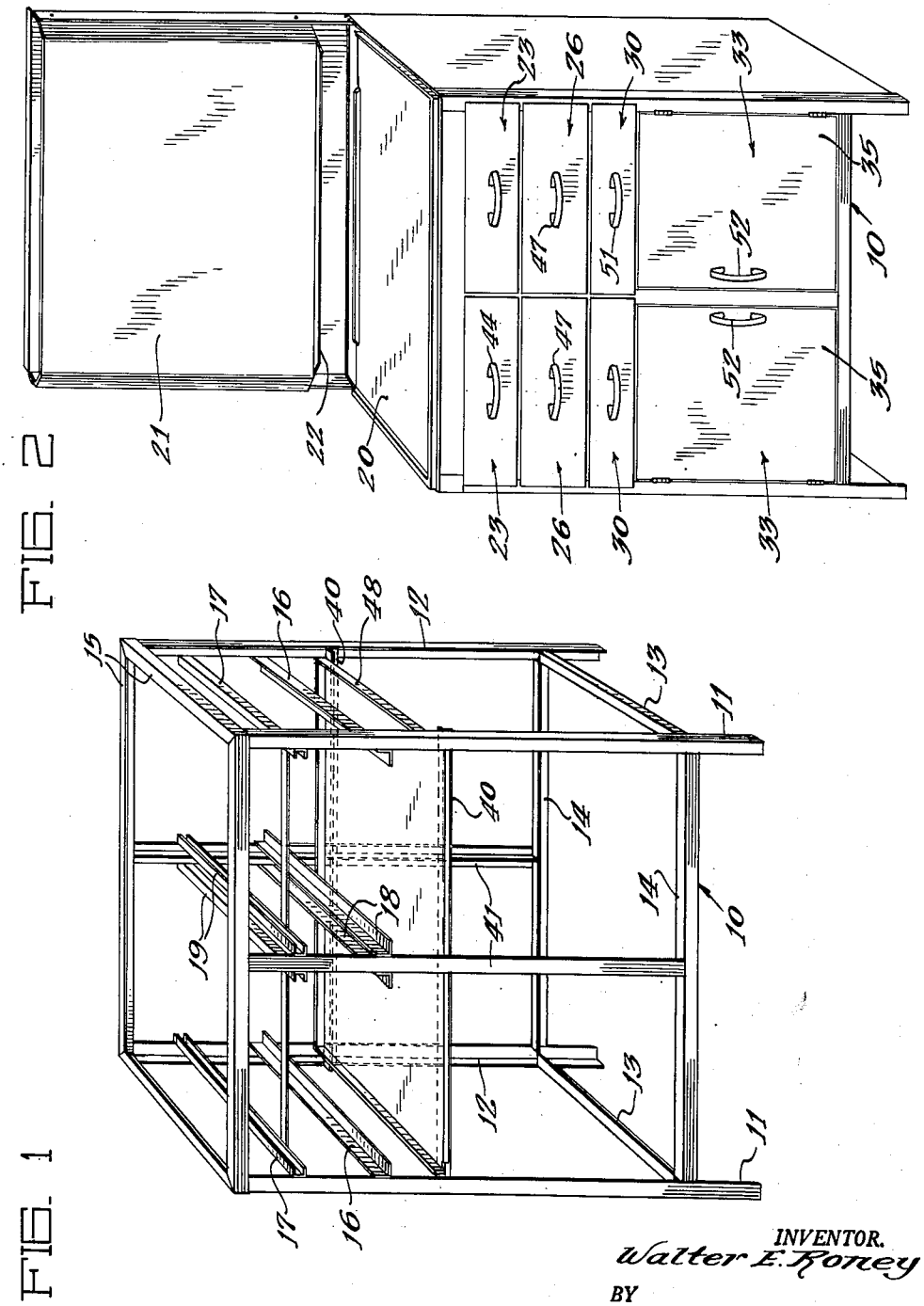

INVENTOR.
Walter E. Roney
BY
Wallace and Cannon
Attorneys

Patented Dec. 16, 1952

2,621,586

UNITED STATES PATENT OFFICE 2,621,586

COMBINATION CHARCOAL BROILER AND GRIDDLE

Walter E. Roney, Chicago, Ill.

Application March 8, 1951, Serial No. 214,580

2 Claims. (Cl. 99—339)

This invention relates to a combination charcoal broiler and griddle apparatus.

An object of the invention is to provide a new and improved combination charcoal broiler and griddle in the use of which it is possible effectively to broil steaks, chops, hamburgers, or other food products in the broiler embodied in the new apparatus while, at the same time, frying other food products, such, for example, as eggs, bacon, ham, sausage, hot cakes, potatoes, onions on the hot plate or griddle embodied in the new apparatus, in a relatively fast, efficient and economical manner.

Another object of the invention is to construct the new combination charcoal broiler and griddle apparatus in such a manner that the various elements thereof may be readily handled in use and without danger of burning the hands of the user.

Other objects of the invention are: to construct and arrange the parts of the new combination charcoal broiler and griddle apparatus in such a manner that the broiler units, charcoal fire box units, and ash receptacle units are all slidably mounted in and movable relative to the supporting frame structure embodied in the combination charcoal broiler and griddle apparatus; to construct and arrange the new charcoal broiler and griddle apparatus in such a manner that the movable parts thereof are effectively insulated against heat loss and are safe for the operator to handle; to construct the new combination charcoal broiler and griddle apparatus in such a manner that grease formed in the use thereof is effectively collected while, at the same time, is effectively prevented from being burned; and to construct the new combination charcoal broiler and griddle in such a manner that fumes formed in the use thereof are effectively removed.

Other objects will appear hereinafter.

In the drawings:

Fig. 1 is a perspective view showing the frame construction of the new combination charcoal broiler and griddle apparatus;

Fig. 2 is a perspective view showing the new combination charcoal broiler and griddle apparatus in assembled or completed form;

Fig. 3 is a central vertical sectional view of the new combination charcoal broiler and griddle apparatus;

Fig. 4 is a top plan view, partly in section, on line 4—4 in Fig. 3;

Figure 5:
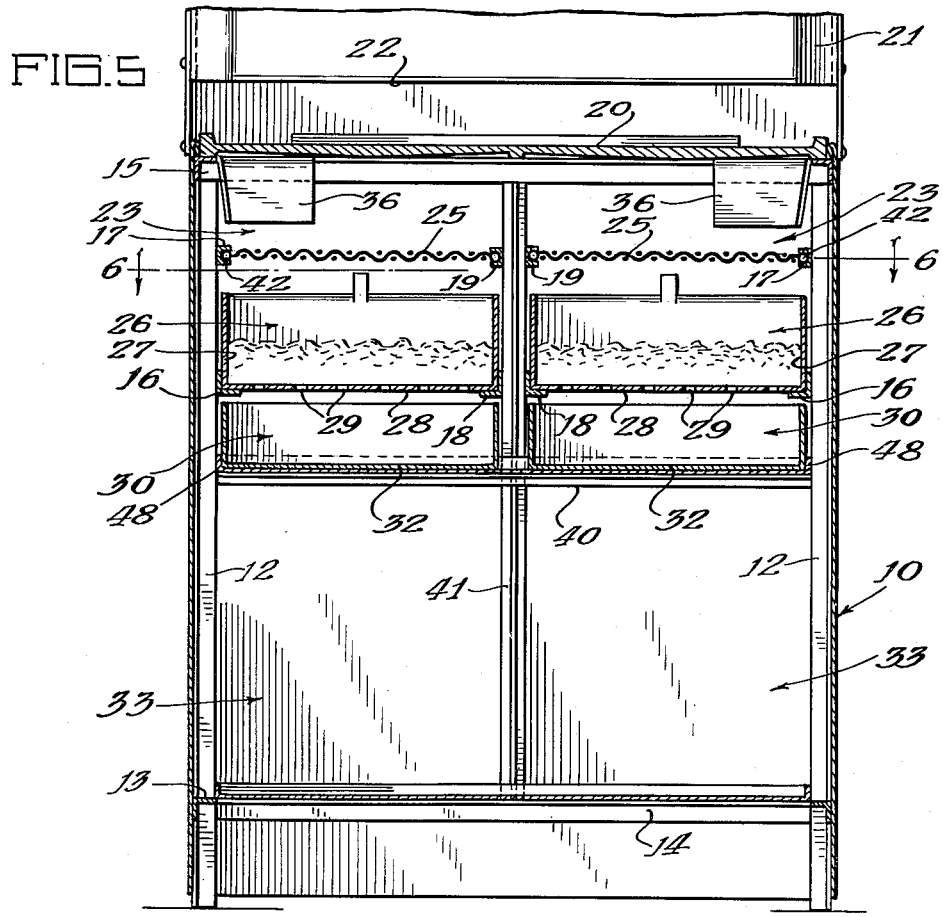
Fig. 5 is a central vertical sectional view on line 5—5 in Fig. 3.

The frame construction of the new combination charcoal broiler and griddle apparatus is illustrated in Fig. 1 of the drawings, wherein it is generally indicated at 10, and is shown as being of metallic construction and as being composed of metallic parts suitably welded together and including front legs 11, rear legs 12, lower horizontal cross braces 13 and 14, horizontal top rails 15, intermediate horizontal rails 40, and intermediate vertical braces 41, and associated parts.

An outer and lower L-shaped guide rail 16 extends between and is secured to each pair of front and rear vertical legs 11 and 12, and a channel or U-shaped upper guide rail 17 extends between each pair of front and rear vertical legs 11 and 12, above each of the guide rails 16. A pair of L-shaped guide rails 18 are fastened to and extend between the central vertical braces 41, one on each side thereof, and a pair of channel shaped guide rails 19 extend between and are fastened to the central vertical braces 41, above the guide rails 18, and one on each side of the central vertical braces 41.

The new combination charcoal broiler and griddle apparatus includes a hot plate or griddle plate 20, which is mounted upon and is suitably secured to the upper horizontal frame members 15, and a ventilator stack 21 is mounted at the rear of the hot plate or griddle 21 and has an inlet 22 at the front and lower end thereof which is disposed somewhat above the hot plate or griddle 20, at the rear thereof.

The new combination charcoal broiler and griddle includes a pair of slidable broiler units or trays 23 which are slidably mounted upon the guide rails 17 and 19 respectively, one at each side of the central vertical braces 41. Each of these slidable broiler units or trays 23 includes a rod-like metal frame 37 embodying a pair of side frame members 42, which are generally cylindrical or rod-like in form (Fig. 5), and which are slidably mounted in the channel-shaped guide rails 17—19. Each of the broiler units or trays 23 also embodies an open wire grille member 25 (Fig. 6) which is attached to and is carried by the frame 37. Each of the broiler units or trays 23 also embodies an inner and heat-insulating front wall 43, which is attached to and is carried by the frame 37, and an outer front wall 24 which is attached to the inner front wall 43, and is spaced therefrom (Fig. 3). A handle 44 is attached to the outer front wall 24 of each of the broiler units or trays 23.

The new combination charcoal broiler and griddle apparatus also includes a pair of charcoal-burning fire box units 26 which are disposed below the broiler units or trays 23. Each of these charcoal-burning fire box units 26 includes a slidable drawer 27 which has a bottom wall 28 which is slidably mounted upon a pair of the horizontal guide rails 16 and 18, respectively, each of the said bottom walls 28 being provided with perforations 29 (Fig. 3).

Each of the charcoal-burning trays 26 has a heat-resistant or heat-insulating inner front wall 46 and an outer front wall 47 spaced therefrom and which is provided with a handle 47.

The new combination charcoal broiler and griddle apparatus also includes a pair of ash-receiving drawers or receptacles 30, each of which is slidably mounted below the corresponding one of the charcoal-burning fire box units 26. Each of these ash-receiving drawers or receptacles 30 includes a front wall 31 and a bottom wall 32 which is slidably mounted and guided on guide rails 48 in the frame structure 10, as shown (Fig. 3). Each of the ash-receiving drawers or receptacles 30 includes a heat-resistant inner front wall 49 and an outer front wall 50 spaced therefrom and provided with a handle 52.

The new combination charcoal broiler and griddle also includes a pair of storage receptacle units 33 which are arranged below the ash receptacle drawers or receptacles 30 and each of which includes a storage compartment 34 having a hinged front door 35 provided with a handle 52. These storage compartments 34 are adapted to receive food, charcoal, etc.

Figure 6:
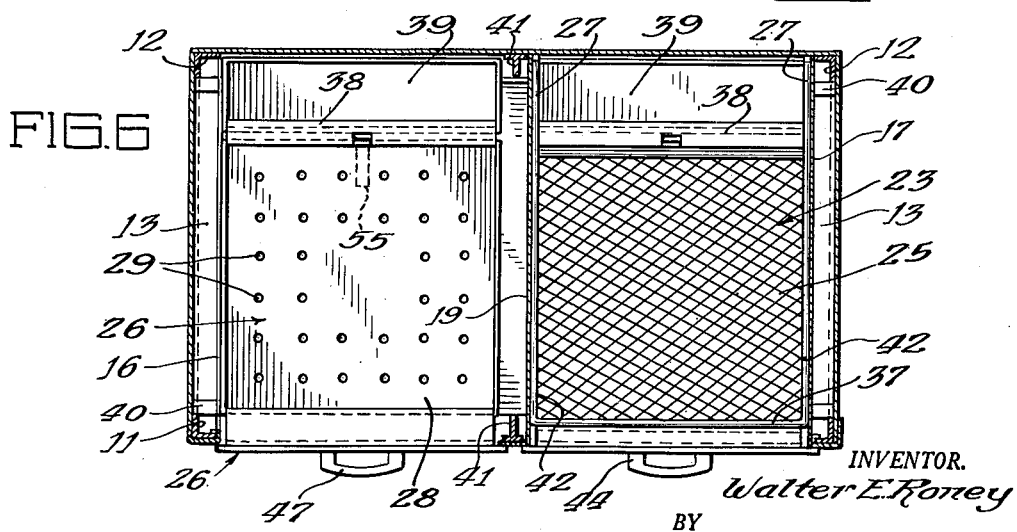
Fig. 6 is a sectional plan view on line 6—6 in Fig. 5.

A pair of grease drip members 36 are mounted in the frame structure 10 below the open lower end 22 of the fume stack 21, one of these grease drip members 36 being located at each side of and below the hot plate or griddle 20 (Figs. 3 and 5).

An inclined grease drip shelf 38 is mounted on the rear wall 53 of each of the charcoal-burning trays 26 and each of these shelves 38 opens downwardly into a grease receptacle or pan 39. Each of these grease pans 39 is mounted on a raised portion 54 of a supporting shelf 55 which is mounted in the frame structure 10 above the ash-receiving drawers or receptacles 30 and below the charcoal-burning trays or receptacles 26 (Fig. 3).

In the use of the new combination charcoal broiler and griddle charcoal may be placed in the charcoal-burning fire box units 26, on the perforated bottom walls 28—29 thereof. Steaks or other food products to be broiled may be placed on the broiler trays 23, upon the broiler grilles 25 and bacon and eggs, or other food products to be fried or grilled may be placed upon the hot plate or griddle 20, whereupon the charcoal in the charcoal-burning units 26 may be ignited. The heat from the burning charcoal in the charcoal-burning fire box units 26 will thereupon pass through the foraminated broiler screens or grilles 25 and broil the steaks or other food products thereon, while, at the same time, a portion of the heat thus generated will also pass upwardly against the hot plate or griddle 20 to accomplish the operation of frying bacon and eggs or other food products which are to be fried thereon.

The fumes from the operation of broiling steaks or like food products on the broiler screens or grilles 25 will pass upwardly into the ventilator stack 21 and escape therefrom to the atmosphere as will also fumes from the hot plate or griddle 20.

Grease which may collect in the ventilator stack 21 will flow downwardly through the grease drip spouts or members 36 and the open rear end portion of the broiler screen frames 37 and will be guided by the inclined drip shelves 38 into the grease receptacles or pans 39, which may be removed, as desired, by removal of the charcoal-burning trays 26.

In the use of the new combination charcoal broiler and griddle the various parts including the slidable broiler units 23, the charcoal receptacles 26, and the ash receptacles 30 may be handled and removed from the frame structure 10 without danger of burning the user's hands by reason of the attachment of the handles 44, 47, and 51, to the front walls 24, 27, and 31, which are spaced from the heat-resistant inner walls 43, 46 and 49, of the broiler units 23, charcoal-burning trays 26, and ash receptacles 30, respectively.

The new charcoal broiler and griddle unit is economical and efficient in use by reason of the fact that the fire box units 26 are so positioned that the heat generated therein is utilized to broil steaks or other food products on the broiler screens 25 while, at the same time, bacon and eggs or other food products may be fried or grilled on the hot plate or griddle 20.

It will thus be seen from the foregoing description, considered in conjunction with the accompanying drawings, that the present invention provides a new and improved combination charcoal broiler and griddle having the desirable advantages and characteristics, and accomplishing its intended objects, including those hereinbefore pointed out and others which are inherent in the invention.

I claim:

1. A combination griddle and broiler unit comprising a frame structure having slidably mounted in superimposed relation on guide rails therein, a broiler unit in the form of a tray and including a foraminated screen, a fuel receiving unit below the broiler unit and having a perforate bottom wall, an ash receptacle unit below the fuel receiving unit, each of the said units including an inner fire resistant front wall and an outer front wall spaced therefrom provided with a handle, a griddle plate mounted on the top of the frame structure above the broiler unit, a fume stack secured to the frame structure and having an open lower end located above the rear of the griddle plate, the broiler unit having an open rear end portion arranged below and in alignment with the open lower end of the fume stack, the fuel receiving unit including a rear wall spaced from the inner rear side of the supporting frame, a grease receptacle removably mounted on a shelf of the frame structure behind the rear wall of the fuel receiving unit, the grease receptacle being in alignment with open lower end of the fume stack and the open rear end portion of the broiler unit, and a rearwardly extending and downwardly inclined grease drip guide shelf secured to the rear wall of the fuel receiving unit and being located in alignment with and below a portion of the opening at the rear of the broiler unit and above the grease receptacle.

2. A combination griddle and broiler as defined in claim 1 which includes a second grease drip guide shelf secured to the supporting frame below the open lower end of the fume stack and behind the griddle plate, the said second grease drip guide shelf being in alignment with the opening at the rear of the broiler unit.

WALTER E. RONEY.

REFERENCES CITED

The following references are of record in the file of this patent:

UNITED STATES PATENTS

| Number | Name | Date |
|---|---|---|
| 1,169,168 | Lane | Jan. 25, 1916 |
| 1,751,219 | Seamon | Mar. 18, 1930 |
| 2,114,693 | Babin | Apr. 19, 1938 |
| 2,307,914 | Bitney | Jan. 12, 1943 |
| 2,313,968 | Reich | Mar. 16, 1943 |
| 2,321,500 | Meachem et al. | June 8, 1943 |
| 2,520,067 | Sagen | Aug. 22, 1950 |

FOREIGN PATENTS

| Number | Country | Date |
|---|---|---|
| 4 | Great Britain | 1859 |
| 550,218 | Great Britain | Dec. 29, 1942 |